Jan. 19, 1960     L. ROBBINS     2,922,108
SPEED MEASURING DEVICE
Filed March 21, 1955
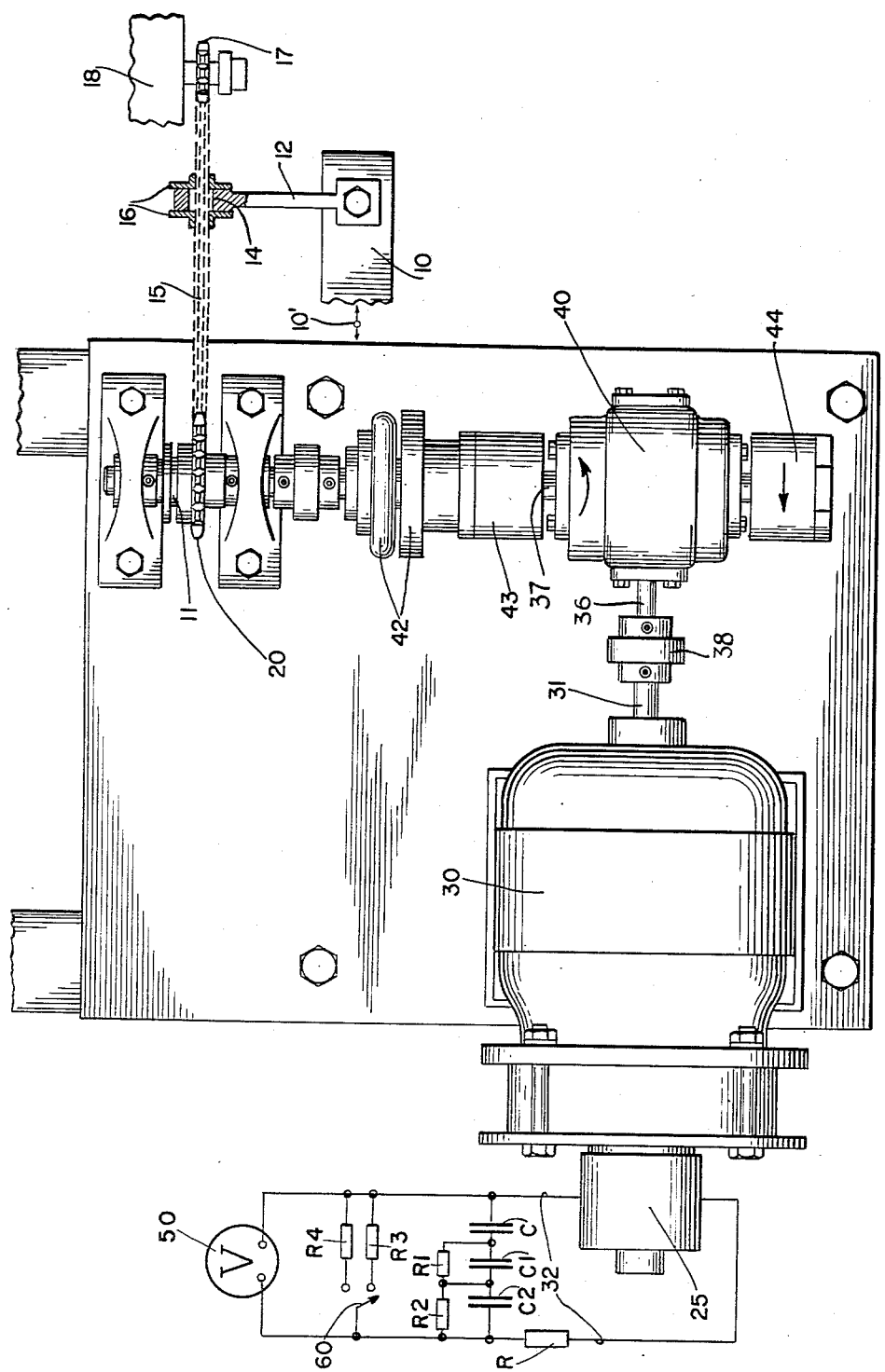

United States Patent Office 2,922,108
Patented Jan. 19, 1960

2,922,108
SPEED MEASURING DEVICE

Leo Robbins, Brooklyn, N.Y., assignor, by mesne assignments, to Baldwin-Lima-Hamilton Corporation, Philadelphia, Pa., a corporation of Pennsylvania Application March 21, 1955, Serial No. 495,393

8 Claims. (Cl. 324—70)

This invention relates to speed measuring and indicating devices. More particularly the invention relates to the measurement and indication of extremely slow speeds such as those employed in the operation of forging and extrusion presses. In such presses, rams may move faster than 35 ft./min. during the approach and return strokes and as slow as ¼ inch/min. during, or toward the end of, the working stroke. It is the latter speed range which is difficult to measure, and yet the measurement and indication of such speeds are highly desirable for control of the end product. This is especially the case when working on modern high tensile materials where the rate of deformation must be closely controlled.

It is not possible to measure the aforesaid extremely slow speeds of the ram by utilizing simple multiplying gearing because the step-up ratio would have to be so large that the initial torque would tend to overload the parts or the mechanism may even be locked due to great friction losses, and at high approach speeds the resulting speed of the tachometer would be excessive. In extrusion presses the extruded product moves much more rapidly than the ram, and at a measurable rate, but in many presses the extruded product is not accessible until as much as 7 feet from the dies. At this point it is too late to control the extrusion.

It is therefore one of the principal objects of this invention to provide an instrument for the accurate measurement and indication of the speeds of the rams of forging and extrusion presses throughout their working range, including the slow final movements, without interference by the high approach speeds.

Since the rams of such presses operate in a range from relatively fast to extremely slow speeds, it is another object of this invention to provide means for indicating such speeds on a single scale with substantially uniform degree of accuracy of reading over the entire range.

Further objects and advantages of this invention will become apparent in the following detailed description thereof.

In the accompanying drawing, the single figure is a plan view of an assembly of elements embodying one form of this invention, including a wiring diagram of the indicating system.

Referring to the drawing, the invention is disclosed as applied to a movable member 10 whose rate of movement is to be measured and indicated. The member 10 may be the ram of a forging or extrusion press actuated by a source of power indicated at 10', or it may be any other movable member whose range of movement from relatively fast to exceedingly slow presents the problem set forth in the introduction hereto. The movements of member 10 in the directions of the arrows may be transmitted to an operated shaft 11 by means such as an arm 12 fixed to member 10 at one end and having an opening 14 through which extends a roller chain 15. The roller-chain has collars 16 fixed thereto on opposite sides of arm 12 so that movement of the arm in either direction will move the roller-chain correspondingly. The roller-chain extends over a sprocket 17 on the fixed frame 18 and over a sprocket 20 fixed to operated shaft 11.

The rate of movement of operated shaft 11, and therefore the rate of movement of movable member 10, may be measured and indicated upon a suitable rate indicator, such as tachometer 25. The tachometer may be a 96-pole A.C. type driven by a second source of power such as the armature of a torque motor 30 which directly supplies mechanical energy to the tachometer. Motor 30 tends to operate at a predetermined speed but shaft 31 of the armature is effectively geared to the movable member 10 (by means to be described), and the load of said member is so great that shaft 31 cannot rotate except when member 10 moves, and then only as a function of the rate of movement of said member.

Thus, it will be clear that the movable member 10 when connected to shaft 31 applies a braking force to motor 30 in inverse proportion to the instantaneous speed of member 10. Accordingly, the movable member 10 controls the speed of operation of motor 30 in proportion to its own speed.

As stated in the introduction hereto, the final movements of the rams of forging and extrusion presses are so slow that if member 10 were directly coupled to armature shaft 31 no conveniently measurable output would be obtained from the tachometer terminals 32. Therefore reduction gearing 40 is interposed between the shaft 31 of torque motor 30 and the operated shaft 11 whereby the motor shaft is permitted to run any desired number of times as fast as shaft 11, for example, the ratio may be 100:1. Multiplication of the rate of movement of shaft 11 is thus obtained. The reduction gearing has a high-speed end in the form of a shaft 36, and a low-speed end in the form of a shaft 37. Motor 30 is arranged to drive the high-speed or input shaft 36 by means of a coupling 38 which mechanically connects shafts 31 and 36.

When the sprocket is operated in the reverse direction (as, for instance, during return of the ram to initial position) it operates against the action of the torque motor 30 which is unidirectional. The force thus created could destroy the mechanism, and for this reason a friction clutch 42 is provided between the reduction gearing 40 and the operated shaft 11.

As stated in the introduction hereto, the movable member 10 has a relatively rapid initial movement (35 ft./min. in the case of forging and extrusion presses), at which time the sprocket 20 and operated shaft 11 will run at a speed so high that if transmitted and multiplied by the gearing 40 to the tachometer, it may be sufficient to destroy the tachometer and the indicating instruments. To prevent this, an overrunning clutch 43 may be inserted between the reduction gearing 40 and the shaft 11. Thus, if the maximum torque motor speed is, for example, 600 r.p.m., and the ratio of the reduction gearing is 100:1, the motor will not be able to follow speeds of shaft 11 in excess of 6 r.p.m. Since shaft 11 may operate faster than this limit, the overrunning clutch 43 in the drive between the reduction gearing and shaft 11 will permit it to rotate at any higher speed without the tachometer rotating faster than 600 r.p.m.

If the friction clutch 42 should for some reason fail to function, the sprocket and shaft 11 might tend to drive the motor in the reverse direction. This can be prevented by a back-stop clutch 44.

The output of the tachometer may be indicated upon a suitable instrument such as a vacuum tube voltmeter 50. In the absence of any other provisions, the output of the tachometer would operate the voltmeter linearly corresponding to r.p.m. of the motor ranging from 0 to maximum, such as 600, for example. Such linear indication means that the percentage of error in indication is much higher in the low range than in the upper range. To make the degree of accuracy of the low end of the scale substantially the same as at the high end, the low end must be stretched out progressively relative to the high end. For this purpose, because an A.C. tachometer has the output voltage, as well as the frequency, proportional to the r.p.m. to be measured, there can be employed a filter network consisting of a plurality of filter units which will transform linear tachometer output to approximately logarithmic. The network may comprise a resistance R in series with the tachometer output voltage and a series of impedance-units, which may be capacitors C, $C_1$, $C_2$, and resistances $R_1$, $R_2$ in parallel with the voltmeter input voltage. The impedances may be of varying characteristics so that first the unit of highest impedance at lowest frequency, in my example, the capacitor C, will be principally effective, and then the other impedance units comprising resistances and capacitances connected in parallel will successively become principally effective.

At low frequency, little current passes through C, and much less current passes through $C_1$ and $C_2$ because $R_1$ and $R_2$ pass most of the current. There is little voltage drop across R, and the voltmeter shows substantially the entire voltage at the tachometer output terminals. As the frequency increases, the voltage at the tachometer output increases linearly, but the voltage across the voltmeter increases at a lesser rate because C begins to conduct current more freely, causing increased voltage drop across R which is vectorially subtracted from the voltage which would otherwise be impressed across the voltmeter. Instead of linear increase in voltage across the voltmeter, there occurs a progressively reduced rate of increase.

On reaching a frequency at which the ratio of reactance of capacitor C to the resistance R becomes negligible, no further increase of consequence in voltage across C will take place in response to increase in voltage and frequency of the tachometer. Therefore, if C would have been connected directly to R in the absence of $C_1$, $C_2$, $R_1$, $R_2$ no further increase in voltage across the voltmeter would occur no matter how fast the tachometer would run. To extend the indicated range beyond the above explained cut-off point, and to make the scale distribution more closely logarithmic, any number of additional filter units such as $C_1R_1$ and $C_2R_2$ can be added. The values of the components are so chosen that at lower frequencies the units are mainly resistive and low compared to the reactance $C_1$ and so do not substantially affect the voltage across the voltmeter. As the tachometer output voltage and frequency increase, the impedances of the units $C_1R_1$ and $C_2R_2$ become more capacitive, and before the cut-off point of voltage increase across C is reached, the ratio of the impedance of $C_1R_1$ to the reactance C becomes such as to substantially affect the voltage across the voltmeter, by vectorially adding the voltage across C and $C_1R_1$ units. The increase of the voltage across the units $C_1R_1$ will have a cut-off point in the same manner and for the same reason as explained above for C, but this cut-off point will be located at a higher frequency if the values of $C_1$ and $R_1$ are properly chosen. Before the voltage cut-off point of the unit $C_1R_1$ is reached, the unit $C_2R_2$, which has a still higher cut-off point, should become effective.

The filter can contain any number of C, R, or L units, which can be arranged to approximate any desired scale-distribution by choosing different C, R, or L values.

In order to multiply the scale without disturbing the distribution, resistors $R_3$, $R_4$ may be switched into parallel with the voltmeter and across the output terminals of the filter, and may be selectively inserted in the parallel circuit by a suitable switch 60.

Having described my invention, what I claim and desire to secure by Letters Patent is:

1. An instrument for indicating the speed of a movable member adapted to be actuated by a first power source at varying speeds, comprising a speed responsive device, a second power source directly supplying mechanical energy for driving the speed responsive device, reduction gearing having a high-speed end and a low-speed end, means for driving the high-speed end of the reduction gearing mechanically from said second power source, and means mechanically connecting the low-speed end of the reduction gearing to the movable member, whereby said movable member mechanically brakes and thus controls the speed of operation of said second power source in proportion to the speed of said movable member.

2. An instrument for indicating the speed of a movable member adapted to be actuated by a first source of power at varying speeds, comprising a speed responsive device, a second power source in the form of a motor having a rotatable member directly supplying mechanical energy for actuating the speed responsive device, reduction gearing having a high-speed shaft and a low-speed shaft, means for driving the high-speed shaft mechanically from the rotatable member, and means including an operated shaft mechanically connecting the low-speed shaft and the movable member, the load of said movable member being sufficient mechanically to brake and thus control the speed of rotation of said rotatable member in proportion to the speed of said movable member.

3. An instrument for indicating the speed of a movable member as specified in claim 2, in which an overrunning clutch is provided between the reduction gearing and the operated shaft.

4. An instrument for indicating the speed of a movable member as specified in claim 2, in which a friction clutch is provided between the reduction gearing and the operated shaft.

5. An instrument for indicating the speed of a movable member as specified in claim 2, in which a friction clutch and an overrunning clutch are provided between the reduction gearing and the operated shaft.

6. An instrument for indicating the speed of a movable member as specified in claim 5, in which the reduction gearing is provided with a back stop clutch.

7. An instrument for indicating the speed of a movable member as specifier in claim 1, in which said speed responsive device is adapted to generate an A.C. output, the voltage and frequency of which change in accordance with variations in the speed of the movable member, and which includes a voltmeter actuated by the voltage generated by said device, and means whereby in response to changes in frequency the voltmeter indication is rendered non-linear with respect to the speed of the movable member, said last-named means comprising a series of frequency-sensitive filter units consisting of resistive and reactive elements connected between said device and said voltmeter.

8. An instrument for indicating the speed of a movable member adapted to be actuated by a first power means at varying speeds, comprising a speed responsive device, a second power means receiving energy independently of said first power means for actuating said speed responsive device, said second power means tending to operate at a predetermined speed, and means whereby said movable member applies a braking force to the second power means inversely proportional to the instantaneous speed of said movable member.

References Cited in the file of this patent

UNITED STATES PATENTS

| 2,211,543 | Kollsman | Aug. 13, 1940 |
|---|---|---|
| 2,338,599 | Ridgway | Jan. 4, 1944 |
| 2,509,089 | Ergen | May 23, 1950 |